(12) United States Patent
Hartmann et al.

(10) Patent No.: US 6,722,832 B2
(45) Date of Patent: Apr. 20, 2004

(54) ASSEMBLY UNIT INCLUDING A COMPONENT AND AT LEAST ONE THREAD FORMING SCREW

(75) Inventors: Gunther Hartmann, Alsfeld (DE); Wolfgang Sommer, Gemünden/Wohra (DE); Frank Wagner, Grossen-Buseck (DE)

(73) Assignee: Kamax-Werke Rudolf Kellermann GmbH & Co., KG, Osterode (DE)

( * ) Notice: Subject to any disclaimer, the term of this patent is extended or adjusted under 35 U.S.C. 154(b) by 0 days.

(21) Appl. No.: 10/278,479

(22) Filed: Oct. 23, 2002

(65) Prior Publication Data

US 2003/0053885 A1 Mar. 20, 2003

Related U.S. Application Data

(63) Continuation of application No. PCT/EP01/04438, filed on Apr. 19, 2001.

(30) Foreign Application Priority Data

Apr. 25, 2000 (DE) .......................................... 10020218

(51) Int. Cl.[7] ............................. F16B 21/18; F16B 39/00
(52) U.S. Cl. ...................... 411/353; 411/107; 411/416; 411/970; 411/999
(58) Field of Search ............................... 411/107, 174, 411/175, 352, 353, 416, 970, 999

(56) References Cited

U.S. PATENT DOCUMENTS

| | | | | |
|---|---|---|---|---|
| 1,927,780 A | * | 9/1933 | Anderson | 411/999 X |
| 2,272,178 A | * | 2/1942 | McDowell et al. | 411/999 X |
| 2,907,419 A | * | 10/1959 | Klank, Jr. | 411/999 X |
| 3,018,127 A | * | 1/1962 | Dobrosielski et al. | 411/999 X |
| 4,797,045 A | | 1/1989 | Lautenschliager, Jr. | |

FOREIGN PATENT DOCUMENTS

| | | |
|---|---|---|
| DE | 2706246 C2 | 9/1977 |
| DE | 8216590 | 12/1982 |
| DE | 3208643 A1 | 9/1983 |
| DE | 8631650 | 2/1987 |
| DE | 19651838 A1 | 6/1997 |
| EP | 0086852 B1 | 6/1986 |
| FR | 730845 | 8/1932 |
| FR | 2743122 | 7/1997 |
| GB | 881155 | 11/1961 |
| WO | WO 95/21335 | 8/1995 |

* cited by examiner

*Primary Examiner*—Neill Wilson
(74) *Attorney, Agent, or Firm*—Thomas, Kayden, Horstemeyer & Risley LLP

(57) ABSTRACT

An assembly unit includes a component including at least one through hole and at least one screw. The screw is associated with the through hole of the component. The screw is designed and arranged to produce a thread. The screw includes a head and a supporting surface to face the component. The screw includes a shank at least partly including a thread. The screw in the region of the shank and close to the supporting surface includes an annular channel, the diameter of the annular channel being less than the core diameter of the thread of the screw and the effective axial length of the annular channel being more than the axial length of the through hole. The diameter of the through hole of the component is more than the core diameter of the thread of the screw and being less than the outer diameter of the thread of the screw.

19 Claims, 4 Drawing Sheets

ASSEMBLY UNIT INCLUDING A COMPONENT AND AT LEAST ONE THREAD FORMING SCREW

CROSS REFERENCE TO RELATED APPLICATIONS

This application is a continuation of International Application PCT/EP01/04438 with an International Filing Date of Apr. 19, 2001 and claiming priority to co-pending German Patent Application No. 100 20 218.7 entitled "Montageeinheit aus einem Bauteil und mindestens einer gewindeformenden Schraube", filed on Apr. 25, 2000.

FIELD OF THE INVENTION

The present invention generally relates to an assembly unit including a component and at least one thread forming screw. The component includes a through hole for each screw, and each screw includes a head serving for actuation of the screw, a supporting surface facing said component and a shank at least partly including a thread.

In the field of assembly technology, it is increasingly desired to use assembly units in which a plurality of elements has been pre-assembled to form a pre-assembly unit. In the following, the assembly unit including a component and usually a plurality of screws is connected to a work piece. A typical example of this technology is an upper part and a lower part which have to be interconnected by one or more screws. In such a case, the upper part as the component and the screws form a pre-assembled assembly unit, the screws being captively connected to the component. The assembly unit is then connected to the lower part by screwing the screws into the lower part. The screws may be simultaneously screwed into the lower part, or they may be screwed into the lower part one after the other. Especially, multispindle automatic screwing apparatuses are used for this purpose.

A typical field of use of such assembly units is the automobile industry. For example, a cylinder head cover or a cover of a transmission is the component which is to be connected to the work piece by screws. The work piece is the cylinder block or the housing of the transmission. By using such assembly units, a great level of prefabrication is realized. The screws are already connected to the component in a captive and aligned position. They are prevented from being damaged during transportation, and they may be quickly connected to the work piece.

BACKGROUND OF THE INVENTION

An assembly unit is known from International Application PCT/EP95/00354 published as WO 95/21335 corresponding to U.S. Pat. No. 6,309,156. The known assembly unit includes a component, for example a cover of a housing, and at least one fixing element in the form of a screw. Each screw is associated with a third element, namely a bush being used for captive connection of the screw to the component. The bush is made of metal, especially of sheet metal. The bush increases the production costs of the known assembly unit. During a separate step of pre-assembly, the bush is pressed into a respective through hole being located in the component. The screw has a rather complicated shape. An annular flange is located in the region of the shank of the screw. The annular flange includes annular channels being connected to both sides. The annular flange has to be produced at the shank of the screw in addition to the thread. The size of the annular flange is coordinated with the size of a collar being located at the bush such that there an axial lock is realized, the axial lock still allowing for an axial movement within certain limits. Consequently, the screws are arranged to be captively connected to the work piece, but they are not fixedly connected to the work piece in the pre-assembled position. There also is the possibility of not using an annular flange at the screw. In such a case, special elements have to be located at the bush, these elements in connection with the screw forming an axial lock. Consequently, the bush has a more complicated design. In this case, the thread of the screw may fulfill a part of the function of the axial lock. There is a relationship between the diameter of the through hole in the component and the diameter of the shank of the screw only as far as the screw together with the bush has to be moved through the through hole, and it has to be inserted into the through hole, respectively. However, there is no exact axial alignment of the screw at the component since the screw is movable to a limited extent. This fact may be advantageous for screwing the screw into the work piece if it is ensured that the screw contacts the entrance into the thread into the work piece in a centering way. Due to the danger of tilting effects of the axes of the screw with respect to one another, inserting the free ends of the shanks of the screws into the threads in the work piece is difficult. This disadvantage may be counteracted by the bush as the third element in the known assembly unit having a comparatively great axial length. Especially, the length may be substantially more than the wall thickness of the component. Due to the increase of the length of the bush, the length of the screw also has to be increased. This increase means additional cost expenditure, and it may also have a negative influence on the function in some cases. The additional use of such bushes, meaning using assembly units including at least three separate elements, is disadvantageous as the bush is also clamped when the screw is screwed into the work piece. Especially in the case when a bush being made of comparatively thin deformable sheet metal is used, there is the danger of different deformations of the bushes occurring during tightening of the screws such that it is difficult to apply a reproducible pretension force.

A component being made of plastic to be screwed to a work piece with an intermediate arrangement of a seal is known from German Patent Application No. 196 51 838 A1. A bush is used in a way that it extends through the component. The bush is connected to the seal. The screw has to have an annular flange to be produced in a separate step, the annular flange cooperating with the bush in the sense of an axial lock. In this way, the screw is connected to the bush in a loose but captive way. In addition to the component and the screw, the bush is the third element of the known assembly unit. The bush does not necessarily have to extend through the entire through hole being located in the component. German Patent No. 195 46 072 C2 shows a bush having a shorter axial length and including a conical collar. The collar engages a respective through hole being located in the component and having a partly conical design. The collar only partly engages the through hole under the influence of frictional clamping effects. The captive arrangement is achieved by frictional forces such that there is substantial insecurity. The bush having a disc-like design finally is located between the supporting surface being located at the head of the screw and the respective counter surface being located at the component. The bush is clamped, and there are similar disadvantages as it has been described above.

Furthermore, pre-assembled assembly units also including at least three elements are known, the above described bush being replaced by a clip, a holding clamp or the like.

The third elements means additional expenditure which often also has a disadvantageous effect on the function.

SUMMARY OF THE INVENTION

The present invention relates to an assembly unit including a component and at least one screw. The component includes at least one through hole. The screw is associated with the through hole of the component. The screw is designed and arranged to produce a thread. The screw includes a head and a supporting surface to face the component. The screw includes a shank at least partly including a thread. The screw in the region of the shank and close to the supporting surface includes an annular channel, the diameter of the annular channel being less than the core diameter of the thread of the screw and the effective axial length of the annular channel being more than the axial length of the through hole. The diameter of the through hole of the component is more than the core diameter of the thread of the screw and being less than the outer diameter of the thread of the screw.

The novel pre-assembled assembly unit does not require the use of a third element, as for example a bush, a clip element, a clamp element or the like. The screw and the screws, respectively, is captively and fixedly connected to the component in the pre-assembled position of the assembly unit.

The novel assembly unit includes one or more screws being designed to produce a thread. Such a thread forming screw is to be understood as a screw producing a thread without producing chips when being screwed into a respective bore not yet including a thread. Such screws may be also called thread rolling screws or thread producing screws. There is a certain relationship between the diameter of the through hole being located in the component and the size of the screw, especially in the region of its shank where the thread is located. In this way, the screw extends into the through hole, and it engages the through hole, respectively, during pre-assembly. Consequently, there is not only an axial lock, but also a fixed aligning relationship of the axis of the screw with respect to the component. The alignment of the axis of the screw is determined, and the screw can no longer tilt. When the screw only extends into the through hole but not through it, the thread of the screw is partly located in the region of the through hole and partly at the side of the screw outside of the through hole facing the head of the screw. Consequently, the thread is located in a protected position during transport from the manufacturer of the pre-assembled assembly unit to the place where the assembly unit is used. Thus, the screw will not be damaged during transportation.

Despite the fact of the improved function of the fixed position and the aligned axis in which the screw is captively arranged, there is no need for using a third element, for example a bush, a clip and the like. Consequently, production expenditure is respectively decreased. The expenditure is further decreased by using self forming screws the threads of which may also be used to attain the axial lock. Consequently, there is no need for arranging a separate annular flange at the shank of the screw.

Especially when the component includes a plurality of such screws in the pre-assembled position such that it is designed for multiple screwing connections to the work piece, it is preferred that the screw in the region of the shank between the supporting surface at the head and the threaded portion includes an annular channel forming an undercut. The diameter of the annular channel is less than the core diameter of the thread, and the axial length of the annular channel (taking the respective transition radiuses into account) is more than the axial length of the through hole being located in the component. Due to the chosen design of the thread forming screw, an axial locking and alignment arrangement, on the one hand, and a captive arrangement of the screw, on the other hand, is realized. Additionally, the screw and the screws, respectively, in the region of the annular channel forming the undercut do not contact the thread being produced in the component in a radial direction and in an axial direction. Consequently, taking the tolerances into account, adaptation of the screw and of the screws, respectively, is possible. As soon as the screw with its thread has exited the thread being located in the through hole of the component, the component may adapt with respect to the work piece to a limited extent in an axial and/or a radial direction. When further tightening the screw, the pre-tension force is applied. When using a plurality of screws, possible initial tensioning of the component at the work piece is released by the screws when the threads of the screw exit from the component such that the component reaches a free relative position with respect to the work piece. This adaptation may be used when the screws are screwed into the work piece one after the other. The same applies when a plurality of screws or all screws are screwed into the work piece. When all screws are screwed into the work piece, it is especially advantageous when the bores being located in the work piece into which the screws are to engage do not include threads. Instead, they are bores which have been produced simply by casting or by cutting. In this way, it is not necessary to initially produce threads in the work piece, and the thread forming properties of the screw are used twice. Mutual tensioning of the component with respect to a plurality of screws is prevented since each screw produces its own thread in the bore being located in the work piece. In this way, different angle positions of the threads of the screws are automatically taken into account when screwing in the screws. When meeting respective tolerances, it is also possible to connect the pre-assembled assembly unit consisting of the component and a number of screws with a work piece the bores of which already including threads. This applies to simultaneously screwing a plurality of screws into the work piece as well as to screwing a plurality of screws one after the other.

Each thread being located at the screws may include a joining portion or a connection portion facing away from the head of the screw. The outer diameter of the thread in the joining portion is less than the diameter of the through hole being located in the component. The mutual adaptation is chosen in a way that the screw with the joining portion may be introduced into the through hole and the thread forming function of the thread of the screw is used when screwing the screw into the component. Each thread being located at the screws may include a joining portion, a thread producing channel portion and a smoothening portion. The axial length of the joining portion and of the groove portion are approximately identical to or less than the axial length of the through hole being located in the component. In this case, there is the possibility that each screw does not extend beyond the through hole or only extends beyond the through hole to a small extent in the pre-assembled position of the screw. Such an arrangement may be advantageous when it is desired to realize great safety with respect to damages of the thread of the screw and when a centering function of the free ends of the screws when being connected to the work piece is not of great importance.

On the other hand, there also is the possibility of the thread of the screw including a joining portion, a groove portion being designed and arranged to produce a thread without removing chips and a smoothening portion, the axial length of the joining portion and of the groove portion being more than the axial length of the through hole being located in the component. In such a case, the screw also has a centering function.

In all cases, the shank of the screw in the region of the thread may have a trilobulare cross-section. Such a trilobulare cross-section is a so called an "orbiform" element. This means that it has the same diameter at all positions about the circumference of the cross-section when measuring at distances of 180°, although the cross-section approximately has a triangular shape. Such a trilobulare cross-section also fulfills the function of self-centering effects, and it also allows for forming the thread in the component and possibly also in the work piece without producing chip.

It is especially advantageous when the through hole being located in the component has a diameter which is more than the flank diameter and less than approximately 90% of the outer diameter of the thread being located at the shank of the screw. The diameter of the through hole is located in the range being defined by the two limits. When keeping these limits, resistance during forming of the thread is sufficiently small. In other cases, there would be a weakly formed thread such that the screws cannot be held in the thread as desired. When keeping the described limits, the necessary pretensional force may be applied properly and reproducibly after screwing.

For example, the through hole may be located at the edge of a cover-like component, the edge with its supporting surface either directly contacting the work piece or contacting the work piece with an intermediate arrangement of a seal or a different element. It is also possible that the component includes a supporting surface for combination with the work piece and that the through hole being located in the component is located in an axial rear direction with respect to the supporting surface. Especially when using components having comparatively thin walls, it is possible to design a hat-like impression, especially by deep-drawing, the impression being located in a backward direction with respect to the work piece in the connection direction such that the screw in the pre-assembled position is protected to an increased extent. Since the screw is often made of a material of greater strength than the work piece, there is no actual danger of the surface of the work piece being damaged. In this exemplary embodiment, the length of the screw is increased. However, this is desired for some applications, especially when the screw has a stretching portion of respective axial length.

The connection portion of the thread may be located at the free end of the shank of the screw, and it may begin at the free end of the screw, respectively. On the other hand, it is also possible that the screw at the free end of its shank has a centering portion not including a thread. Such a centering portion protects the thread from being damaged, and it simplifies centering of the component at the work piece by the screws.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
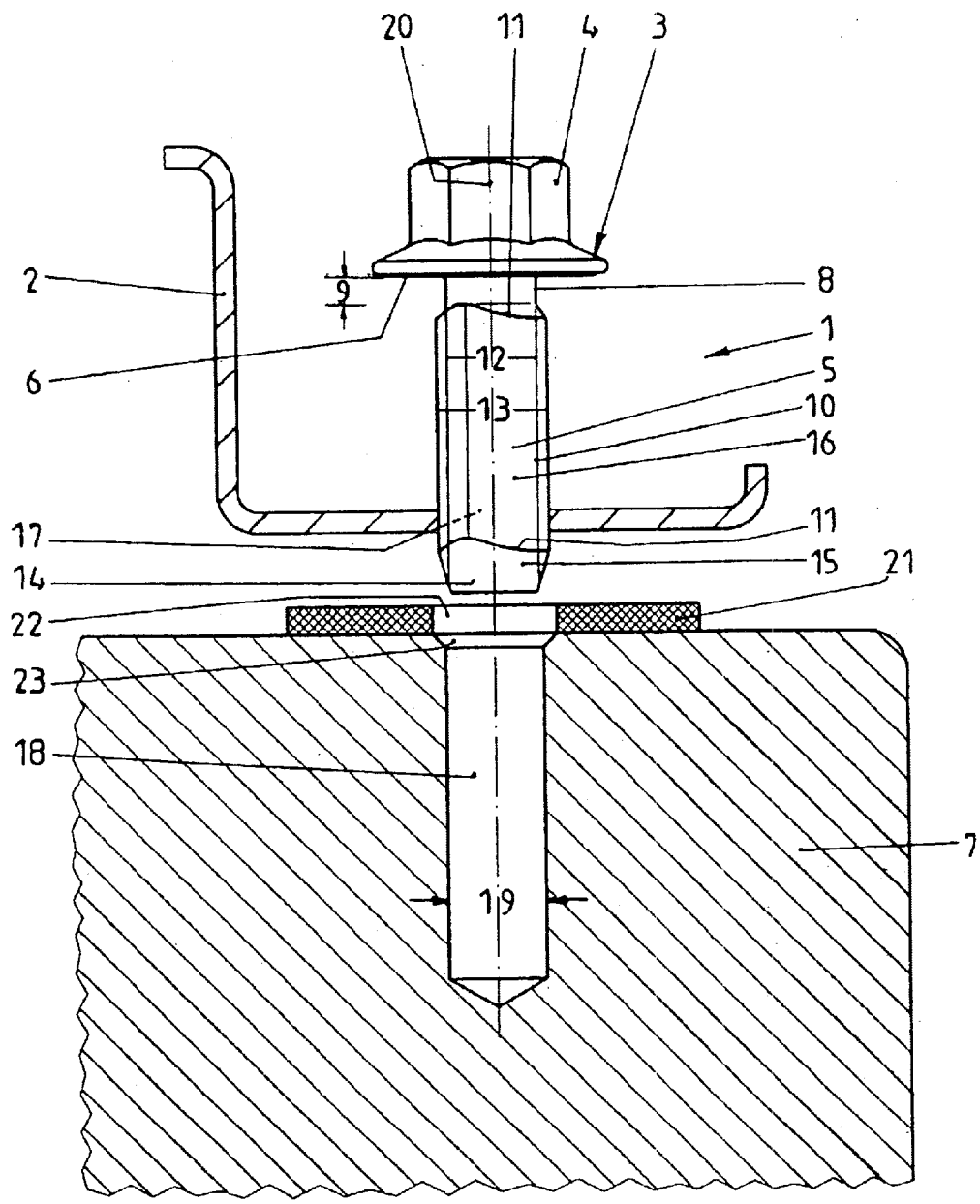
FIG. 1 is a sectional view of a first exemplary embodiment of the novel assembly unit before being connected to a work piece.

Referring now in greater detail to the drawings, FIG. 1 illustrates a part of a novel assembly unit 1. The assembly unit 1 includes a component 2 and at least one screw 3. The figures only show one screw 3 being connected to one component 2. It is to be understood that it is also possible to locate a plurality of screws at each component 2, the screws being located at a respective distance with respect to one another.

The screw 3 includes a head 4 and a shank 5. The head 4 has a known design serving for connection to a torsional tool such as a wrench. The head 4 in the transition region to the shank 5 includes a supporting surface 6 being designed and arranged to contact the component 2 during final assembly of the assembly unit 1 at a work piece 7. Close to the head 4 and the supporting surface 6, respectively, the shank 5 of each screw 3 includes an annular channel 8 having an axial length 9. A thread 10 is located close to the annular channel 8, the thread 10 more or less extending to cover the entire length of the shank 5 close to the annular channel 8. The shank 5 in the region of the thread 10 has a trilobulare cross section 11 being indicated by a curved line. The thread 10 being located at the shank 5 has a core diameter 12 and an outer diameter 13. The flank diameter of the thread 10 is determined according to the known equation. A joining portion or connection portion 14 is located at the free end of the shank 5, the joining portion 14 having a conical design. As seen in the direction towards the head 4, a groove portion or thread producing portion 15 and a smoothening portion 16 are located close to the joining portion 14. The axial lengths of these portions 14, 15, 16 will be further explained with reference to the embodiments according to FIG. 3.

A through hole 17 is located in the component 2. The through hole 17 is designed as a continuous bore. It is to be understood that the component 2 includes such a through hole 17 for each of the screws 3. After its initial production, the through hole 17 has a diameter which approximately corresponds to the diameter 19 of a bore 18 being located in the associated work piece 7 to be connected to the component 2. The diameter of the through hole 17 being located in the component 2 is more than the core diameter 12 of the screw 3, and it is less than the outer diameter 13. During assembly of the assembly unit 1 including the component 2 and the screw 3 being inserted into the component 2, the screw 3 with its connection portion 14 is introduced into the through hole 17 using a respective centering effect. As soon as centering has been attained and due to the trilobulare cross section 11 triple contact with the wall of the through hole 17 has occurred, the screw 3 is screwed further into the through hole 17, the screw 3 fulfilling its thread producing or forming function, and the thread producing portion 15 is effective. Fixed insertion of the screw 3 into the component 2 may be completed in the region of the thread producing portion 15 or the smoothening portion 16. The elements then have a relative position as it is to be seen in FIG. 1. In this way, the thread forming properties of the screw 3 have been used for the first time, meaning in connection with the hole 17 of the component 2. In this pre-assembled position, the screw 3 is not only captively connected to the component 2, but it also securely fixed, and its axis 20 is aligned.

For example, the work piece 7 may be a bottom part, a transmission case and the like. The component 2 may be an upper part, a cover of a housing and the like. During assembly of the assembly unit 1 at the work piece 7, it may be necessary or useful to use a seal 21 also including an opening 22 of a respective size. The bore 18 being located in the work piece 7 preferably includes a chamfer 23 serving to simplify insertion of the connection portion 14 of the shank 5 of the screw 3.

Figure 2:
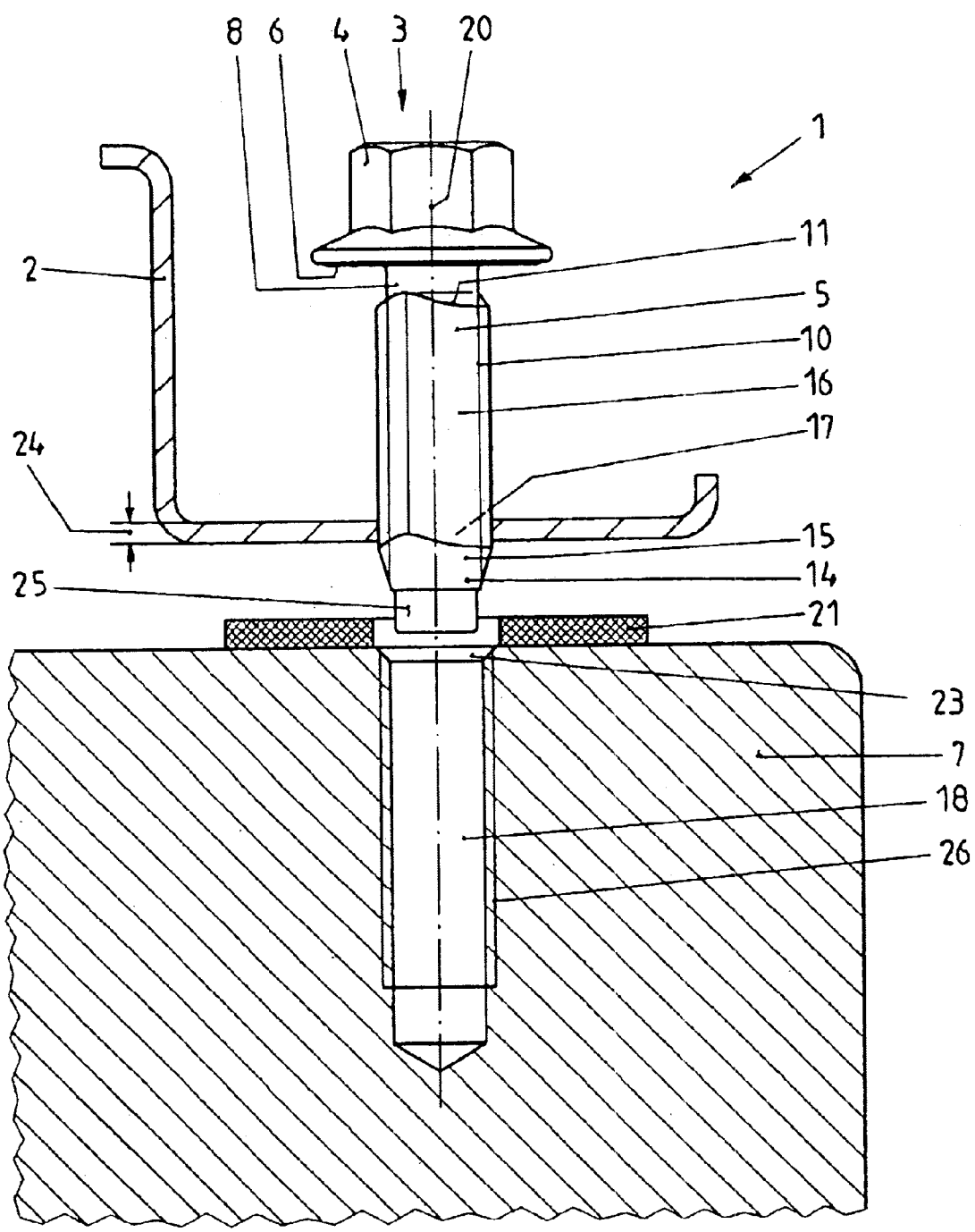
FIG. 2 is a view of a second exemplary embodiment of the novel assembly unit.

FIG. 2 illustrates another exemplary embodiment of the novel assembly unit 1. The illustrated assembly unit 1 has a lot in common with the exemplary embodiment of FIG. 1. Consequently, reference is made to the above description related to FIG. 1. The axial length 24 of the through hole 17 corresponds to the wall thickness of the component 2. The shank 5 of the screw 3 at its free end includes a cylindrical centering portion 25 serving to simplify insertion into the through hole 17 and centering in combination with the connection portion 14. The centering portion 25 again fulfills this function when connecting the assembly unit 1 with the work piece 7. In the illustrated embodiment, the bore 18 being located in the work piece 7 already includes a thread 26 which has been produced by the manufacturer of the work piece 7. When the work piece 7 includes a plurality of bores 18 each including a thread 26, each convolution of the thread being connected to the chamfer 23 is located at a different angle about the axis 20. When the axes 20 of a plurality of screws are arranged comparatively close to one another at the component 2 and/or the wall thickness of the component 2 is comparatively great, there may be difficulties when tightening different screws 3 at the same time. In some cases, these difficulties may be overcome by choosing appropriate tolerances. In special cases, it may be necessary to tighten the screws 3 separately, meaning one after the other. These difficulties do not occur when the bore 18 (as illustrated in FIG. 1) is produced without a thread, and when the thread forming properties of the screws 3 are used for a second time during tightening.

Figure 3:
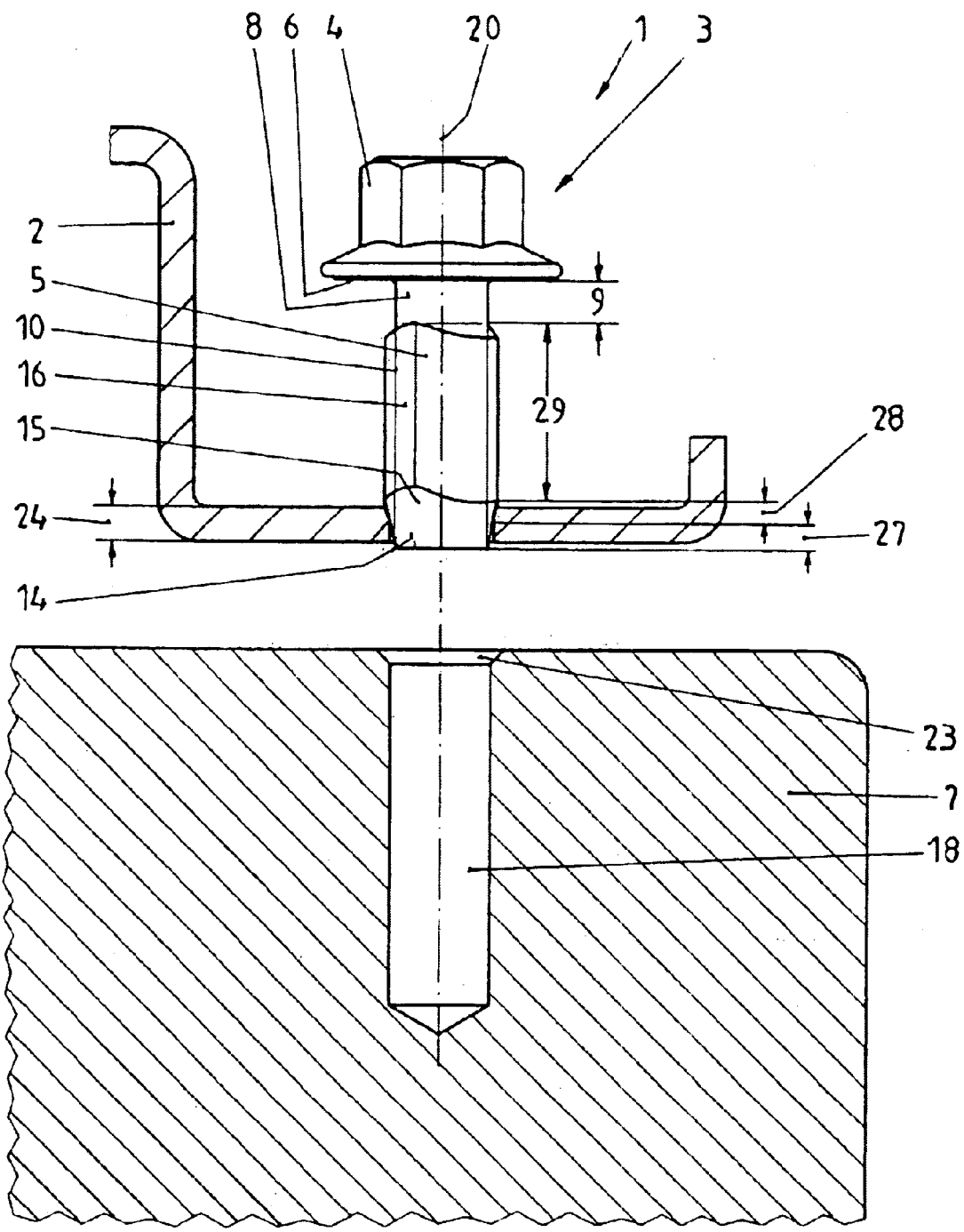
FIG. 3 is a view of a third exemplary embodiment of the novel assembly unit.

In the exemplary embodiment of the novel assembly unit 1 as illustrated in FIG. 3, the thread 10 of the screw 3 is located at the component 2 in a protected way in the assembly unit 1. In addition to the annular channel 8, the screw 3 in the region of its shank 5 includes the joining portion 14. The joining portion 14 begins at the free end of the shank 5. The joining portion 14 is to be understood as the portion of the shank 5 which simplifies initial introduction of the conical free end of the screw 3 into the hole 17, but which does not contact the walls of the bore when later actually screwing the screw 3 into the initially through hole 17 in the component 2. The joining portion 14 approximately has an axial length 27. The channel portion or thread producing portion 15 is arranged close to the joining portion 14. The thread producing portion 15 approximately has an axial length 28 extending along the shank 5 of the screw 3. The thread producing portion 15 is determined by the fact that the outer diameter of the thread 10 changes in this portion. In this way, the thread forming effect is used, and the through hole 17 being especially produced by drilling is deformed, and a thread is produced. The bigger portion of the axial length of the shank 5 is covered by the smoothening portion 16 being connection to the thread producing portion 15 and extending to be connected to the annular channel 8. The smoothening portion 16 is defined by the fact the outer diameter 13 of the thread 10 is constant within this region 16. The smoothening region 16 has an effective axial length 29.

Figure 4:
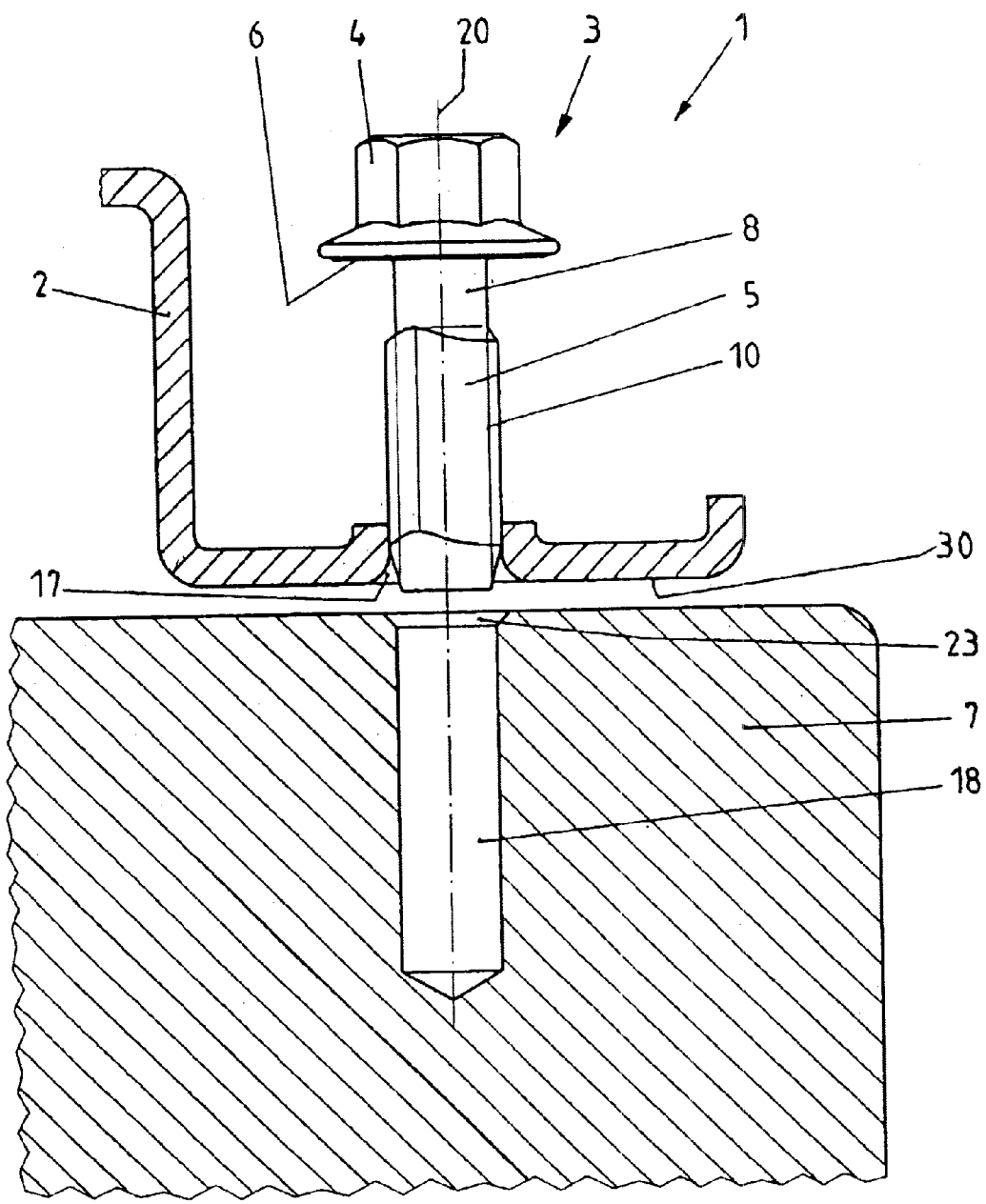
FIG. 4 is a view of a fourth exemplary embodiment of the novel assembly unit.

The exemplary embodiment of the novel assembly unit 1 as illustrated in FIG. 4 has a lot in common with the above described embodiments. Consequently, reference is made to the above descriptions. The component 2 includes a supporting surface 30 facing the work piece 7. The supporting surface 30 directly contacts the work piece 7. The through hole 17 is located in a deep-drawn collar of the component 2 in a backwardly displaced way, meaning in a direction towards the head 4 of the screw 3. Again, there is the possibility of only partly using the thread forming properties of the groove portion 15 when producing the pre-assembled assembly unit 1 such that the free end of the shank 5 does not extend beyond the supporting surface 30, or such that it only protrudes beyond the supporting surface 30 to a small extent. In this way, the thread 10 being located at the shank 5 is protected from being damaged.

Many variations and modifications may be made to the preferred embodiments of the invention without departing substantially from the spirit and principles of the invention. All such modifications and variations are intended to be included herein within the scope of the present invention, as defined by the following claims.

We claim:

1. An assembly unit, comprising:
    a component including at least one through hole, said through hole having a diameter and an axial length; and
    at least one screw,
    said screw being associated with said through hole of said component,
    said screw being designed and arranged to produce a thread,
    said screw including a head and a supporting surface to face said component,
    said screw including a shank at least partly including a thread, said thread having a core diameter and an outer diameter, said shank in the region of said thread having a trilobulare cross section,
    said screw in the region of said shank and close to said supporting surface including an annular channel, said annular channel having a diameter and an effective axial length, the diameter of said annular channel being less than the core diameter of said thread of said screw and the effective axial length of said annular channel being more than the axial length of said through hole,
    the diameter of said through hole of said component being more than the core diameter of said thread of said screw and being less than the outer diameter of said thread of said screw.

2. The assembly unit of claim 1, wherein said annular channel has a shape which is in the form of an undercut.

3. The assembly unit of claim 1, wherein said thread at its side facing away from said head of said screw includes a joining portion the outer diameter of said thread in said joining portion being less than the diameter of said through hole of said component.

4. The assembly unit of claim 3, wherein said thread further includes a thread producing portion and a smoothening portion, said thread producing portion being located close to said joining portion in a direction towards said head of said screw, said thread producing portion having a diameter which increases in a direction towards said head of said screw, said smoothening portion being located close to said thread producing portion in a direction towards said head of said screw, said smoothening portion having a diameter which is approximately constant, said joining portion, said thread producing portion and said smoothening portion each having an axial length, the sum of the axial lengths of said joining portion and of said thread producing portion not being more than the axial length of said through hole of said component.

5. The assembly unit of claim 4, wherein the sum is approximately identical to the axial length of said through hole of said component.

6. The assembly unit of claim 4, wherein the sum is less than the axial length of said through hole of said component.

7. The assembly unit of claim 3, wherein said thread further includes a thread producing portion and a smoothening portion, said thread producing portion being located close to said joining portion in a direction towards said head of said screw, said thread producing portion having a diameter which increases in a direction towards said head of said screw, said smoothening portion being located close to said thread producing portion in a direction towards said head of said screw, said smoothening portion having a diameter which is approximately constant, said joining portion, said thread producing portion and said smoothening portion each having an axial length, the sum of the axial lengths of said joining portion and said thread producing portion being more than the axial length of said through hole of said component.

8. The assembly unit of claim 1, wherein said thread has a flank diameter, the diameter of said through hole of said component being more than the flank diameter and less than approximately 90 percent of the outer diameter of said thread of said screw.

9. The assembly unit of claim 1, wherein said component includes a connection surface being designed and arranged to contact a work piece in the assembled position of said assembly unit, said through hole of said component being arranged to be axially displaced in a direction toward said head of said screw with respect to said supporting surface.

10. The assembly unit of claim 1, wherein said shank has free end facing away from said head, a centering portion being located at the free end of said shank, said centering portion not including a thread.

11. The assembly unit of claim 1, wherein said assembly unit does not include a third element other than said component and said screw.

12. An assembly unit, comprising:
a component including at least one through hole, said through hole having a diameter and an axial length; and
at least one screw,
said screw being associated with said through hole of said component, said screw being designed and arranged to produce a thread in said through hole of said component without producing chips, said screw including a head and a supporting surface to face said component, said screw including a shank at least partly including a thread, said thread having a core diameter and an outer diameter, said thread including a thread producing portion and a smoothening portion, said thread producing portion being located close to said joining portion in a direction towards said head of said screw, said thread producing portion having a diameter which increases in a direction towards said head of said screw, said smoothening portion being located close to said thread producing portion in a direction towards said head of said screw, said smoothening portion having a diameter which is approximately constant, said screw in the region of said shank and close to said supporting surface including an annular channel, said annular channel having a diameter and an effective axial length, the diameter of said annular channel being less than the core diameter of said thread of said screw and the effective axial length of said annular channel being more than the axial length of said through hole, the diameter of said through hole of said component being more than the core diameter of said thread of said screw and being less than the outer diameter of said thread of said screw.

13. The assembly unit of claim 12, wherein said annular channel has a shape which is in the form of an undercut.

14. The assembly unit of claim 12, wherein said thread at its side facing away from said head of said screw includes a joining portion, the outer diameter of said thread in said joining portion being less than the diameter of said through hole of said component.

15. The assembly unit of claim 12, wherein said shank in the region of said thread has a trilobulare cross section.

16. The assembly unit of claim 12, wherein said thread has a flank diameter, the diameter of said through hole of said component being more than the flank diameter and less than approximately 90 percent of the outer diameter of said thread of said screw.

17. The assembly unit of claim 12, wherein said component includes a connection surface being designed and arranged to contact a work piece in the assembled position of said assembly unit, said through hole of said component being arranged to be axially displaced in a direction towards said head of said screw with respect to said supporting surface.

18. The assembly unit of claim 12, wherein said shank has free end facing away from said head, a centering portion being located at the free end of said shank, said centering portion not including a thread.

19. The assembly unit of claim 12, wherein said assembly unit does not include a third element other than said component and said screw.

* * * * *